US011419199B2

(12) United States Patent
Meerbeek et al.

(10) Patent No.: US 11,419,199 B2
(45) Date of Patent: Aug. 16, 2022

(54) METHOD AND CONTROLLER FOR SELECTING MEDIA CONTENT BASED ON A LIGHTING SCENE

(71) Applicant: SIGNIFY HOLDING B.V., Eindhoven (NL)

(72) Inventors: Berent Willem Meerbeek, Veldhoven (NL); Aleksandar Ostojic, Eindhoven (NL); Bartel Marinus Van De Sluis, Eindhoven (NL); Gerhardus Engbertus Mekenkamp, Valkenswaard (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/252,442

(22) PCT Filed: Jun. 13, 2019

(86) PCT No.: PCT/EP2019/065526
§ 371 (c)(1),
(2) Date: Dec. 15, 2020

(87) PCT Pub. No.: WO2019/238834
PCT Pub. Date: Dec. 19, 2019

(65) Prior Publication Data
US 2021/0274620 A1    Sep. 2, 2021

(30) Foreign Application Priority Data

Jun. 15, 2018 (EP) .................................... 18178058

(51) Int. Cl.
*H05B 47/12* (2020.01)
*H05B 47/11* (2020.01)
(Continued)

(52) U.S. Cl.
CPC .............. *H05B 47/12* (2020.01); *A63J 17/00* (2013.01); *H04L 12/2816* (2013.01);
(Continued)

(58) Field of Classification Search
CPC ........ H05B 47/11; H05B 47/12; H05B 47/19; H05B 47/155; H05B 47/10; H05B 47/105;
(Continued)

(56) References Cited

U.S. PATENT DOCUMENTS 9,332,622 B1 *  5/2016  Dutt ........................ H05B 47/19
9,491,827 B2 *  11/2016  Aliakseyeu ............ H05B 45/20
(Continued)

FOREIGN PATENT DOCUMENTS

JP      2003131659 A    5/2003
JP         4773673 B2    9/2011
(Continued)

*Primary Examiner* — Haissa Philogene (57) ABSTRACT

A method and controller for selecting media content based on a lighting scene, the method comprising: selecting the lighting scene, the lighting scene having properties comprising one or more lighting properties; determining one or more of the properties of the selected lighting scene; selecting media content based on the determined one or more of the properties, wherein the media content comprises audio content; controlling a media device to output the selected media content; and adjusting one or more of the lighting properties based on the audio content of the selected media content.

12 Claims, 3 Drawing Sheets

(51) Int. Cl.
    *H05B 47/19*     (2020.01)
    *H05B 47/155*     (2020.01)
    *A63J 17/00*     (2006.01)
    *H04L 12/28*     (2006.01)

(52) U.S. Cl.
    CPC .......... *H05B 47/11* (2020.01); *H05B 47/155* (2020.01); *H05B 47/19* (2020.01)

(58) Field of Classification Search
    CPC ...... A63J 17/00; Y02B 20/40; H04L 12/2816; H04N 21/8549; H04N 21/8456
    See application file for complete search history.

(56) References Cited

U.S. PATENT DOCUMENTS

| | | | |
|---|---|---|---|
| 10,433,029 B2 * | 10/2019 | Xu | H04N 21/8549 |
| 10,555,399 B2 * | 2/2020 | Krajnc | G06F 16/5838 |
| 2010/0300263 A1 | 12/2010 | Van De Sluis et al. | |
| 2010/0302245 A1 * | 12/2010 | Best | G06T 15/50 |
| | | | 345/426 |
| 2015/0338722 A1 * | 11/2015 | Bonnier | G03B 15/07 |
| | | | 362/4 |
| 2020/0007356 A1 | 1/2020 | Mason et al. | |
| 2020/0104030 A1 * | 4/2020 | Dedual | G06F 3/04815 |

FOREIGN PATENT DOCUMENTS

| | | |
|---|---|---|
| WO | 2016044123 A1 | 3/2016 |
| WO | 2017162469 A1 | 9/2017 |

\* cited by examiner

METHOD AND CONTROLLER FOR SELECTING MEDIA CONTENT BASED ON A LIGHTING SCENE

CROSS-REFERENCE TO PRIOR APPLICATIONS

This application is the U.S. National Phase application under 35 U.S.C. § 371 of International Application No. PCT/EP2019/065526, filed on Jun. 13, 2019, which claims the benefit of European Patent Application No. 18178058.6, filed on Jun. 15, 2018. These applications are hereby incorporated by reference herein.

TECHNICAL FIELD

The present disclosure relates to a method, controller and computer program product for selecting media content based on a lighting scene.

BACKGROUND

Connected lighting refers to a system of one or more luminaires (or illumination sources, lighting devices, etc.) which are controlled not by (or not only by) a traditional wired, electrical on-off or dimmer circuit, but rather by using a data communications protocol via a wired or more often wireless connection, e.g. a wired or wireless network. Typically, the luminaires, or even individual lamps within a luminaire, may each be equipped with a wireless receiver or transceiver for receiving lighting control commands from a lighting control device according to a wireless networking protocol such as ZigBee, Wi-Fi or Bluetooth (and optionally also for sending status reports to the lighting control device using the wireless networking protocol). The lighting control device may take the form of a user terminal, e.g. a portable user terminal such as a smartphone, tablet, laptop or smart watch; or a static user terminal such as a desktop computer or wireless wall-panel. In such cases the lighting control commands may originate from an application running on the user terminal, either based on user inputs provided to the application by the user through a user interface of the user terminal (e.g. a touch screen or point-and-click interface), and/or based on an automatized function of the application. The user equipment may send the lighting control commands to the luminaires directly, or via an intermediate device such as a wireless router, access point or lighting bridge.

Light and music are important complementary modalities in ambiance creation. For example, a romantic ballad goes well with candle light, whilst a disco song is well suited to a dynamic colored light setting. With the rise of smart home technologies, music systems, audio systems and lighting systems are connectable and can provide coherent multi-sensorial ambient experiences to end users.

In many current applications, light effects automatically follow the rendered music. For example, a smart phone application can listen to the music being played (e.g. via the microphone) and control the lighting devices such that they react to the song. In another example, metadata of the music being played is used to control the lighting devices. For example, if the music being played has a fast tempo, dynamic lighting can be chosen to match the music.

SUMMARY

Currently, the lighting setting follows from the selected music. This is the desired behavior for some situations like a party or a disco. However, in many situations users might desire to define the ambiance with a lighting system and let the system find the music that fits with the selected lighting ambiance. For example, if a user uses an application to select a relaxation scene in the living room, he may want his system to play music that matches with the relaxation scene. If he puts up an energizing lighting scene in the next morning, a different type of music may be desired.

According to a first aspect disclosed herein, there is provided a computer-implemented method for selecting media content based on a lighting scene, the method comprising: selecting the lighting scene, the lighting scene having properties comprising one or more lighting properties; determining one or more of the properties of the selected lighting scene; selecting media content based on the determined one or more of the properties, wherein the media content comprises audio content; controlling a media device to output the selected media content; and adjusting one or more of the lighting properties based on the audio content of the selected media content.

This enables users to automatically create a coherent lighting and music ambiance just by selecting a lighting scene. Music (or more generally and media including sound such as, for example, a podcast, television program, film, radio channel, etc.) is selected that fits with the selected lighting scene. The properties of the lighting scene are then automatically updated to adapt to the characteristics of the music. For example, the duration of the lighting scene may be extended to match the duration of a playlist of songs. As another example, dynamic aspects of the lighting scene can be adjusted to follow the timing (e.g. beat) of a selected song. The user is therefore able to continuously (or for as long as desired) enjoy a consistent lighting and music ambience, whereby the lighting adapts to (small) changes in the music as the music evolves over time.

In embodiments, the one or more adjusted lighting properties may comprise one or more of: a lighting scene duration, an intensity, a color, a color temperature, and/or a spectral composition.

In embodiments, the determined one or more properties of the lighting scene may comprise one or more of: a name of the lighting scene, one or more descriptive tags, an image, a video, and/or a palette name.

In embodiments, the determined one or more properties of the lighting scene may comprise at least one contextual property, wherein the contextual properties may comprise one or more of: a room type, a lighting device type, and/or a number of lighting devices.

In embodiments, said selecting of media content may comprise selecting one or more of: a song, an album, an artist, a playlist, a genre, a radio channel, and a video.

In embodiments, said selecting of the media content may comprise: determining a score of the lighting scene based on the determined one or more properties; determining a score of one or more items of media content; and selecting at least one of said items of media content based on the determined score of the lighting scene and the determined score of the items of media content.

In embodiments, the determined score may be a single score. Alternatively, the lighting scene may be scored over a first plurality of sequential time intervals, wherein the determined score of the lighting scene is a function of a first plurality of scores determined for the first plurality of sequential time intervals respectively, wherein each item of media content is scored over a second plurality of sequential time intervals, and wherein the determined score of each item of media content is a function of a first plurality of scores determined for the second plurality of sequential time intervals respectively. For example, the function could be the maximum of the plurality of score, or the average of the plurality of scores.

In embodiments, said selecting of the media content may comprise selecting media content having a duration within a predetermined threshold of the lighting scene duration.

In embodiments, the determined lighting properties may comprise at least one color or a description associated with at least one color; and said selecting of the media content may comprise selecting media content having a title and/or lyric that comprises a color matching the at least one color or description (e.g. gloomy, daylight, etc.). For example, the title and/or lyrics may match the determined lighting color.

In embodiments, the media content may be selected based on an association between the media content and the determined one or more properties of the selected lighting scene, and wherein said association is predetermined by a user, and/or wherein said association is automatically created and/or adapted based on one or more associations previously predetermined by the user.

In embodiments, said controlling may comprise controlling the media device to output the selected media content at a volume level, and/or with equalization settings, based on the determined one or more properties of the lighting scene.

In embodiments, the one or more of the lighting properties may be adjusted based on a temporal property of the selected media content.

In embodiments, the lighting scene may be selected automatically in response to a pre-determined trigger, wherein the pre-determined trigger is at least one of: a time-based trigger, an event-based trigger, and a location-based trigger.

In embodiments, the lighting scene may be selected in response to a user input to a user interface. For instance, the user input may comprise one or more of: a voice input, a gesture input, a touch input, etc.

According to a second aspect disclosed herein, there is provided a controller for selecting media content based on a lighting scene, wherein the controller is configured to: receive a selection of the lighting scene, the lighting scene having properties comprising at least one or more lighting properties; determine one or more of the properties of the selected lighting scene; select media content based on the determined one or more of the properties, wherein the media content comprises audio content; cause the selected media content to be output by a media device; and adjust one or more of the lighting properties based on the audio content of the selected media content.

In embodiments, the audio content is not output (immediately or at all) by the media device. For example, the media content may be a playlist of songs. The playlist of songs may be displayed on a display screen of the user device. The user may then select to play the playlist (i.e. played out from one or more loudspeakers). Alternatively, the user may select to ignore the playlist, or request a new playlist.

According to a third aspect disclosed herein, there is provided a computer program product for selecting media content based on a lighting scene, the computer program product comprising code embodied on one or more computer-readable storage media and configured so as when executed on one or more processors to perform operations of: receiving a selection of the lighting scene, the lighting scene having properties comprising at least one or more lighting properties; determining one or more of the properties of the selected lighting scene; selecting media content based on the determined one or more of the properties, wherein the media content comprises audio content; causing the selected media content to be output by a media device; and adjusting one or more of the lighting properties based on the audio content of the selected media content.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Embodiments of the present invention enable media content to be selected based on the properties of a selected lighting scene, and for the properties of the lighting scene to then be adjusted based on the properties of the audio content of the selected media content.

Figure 1:
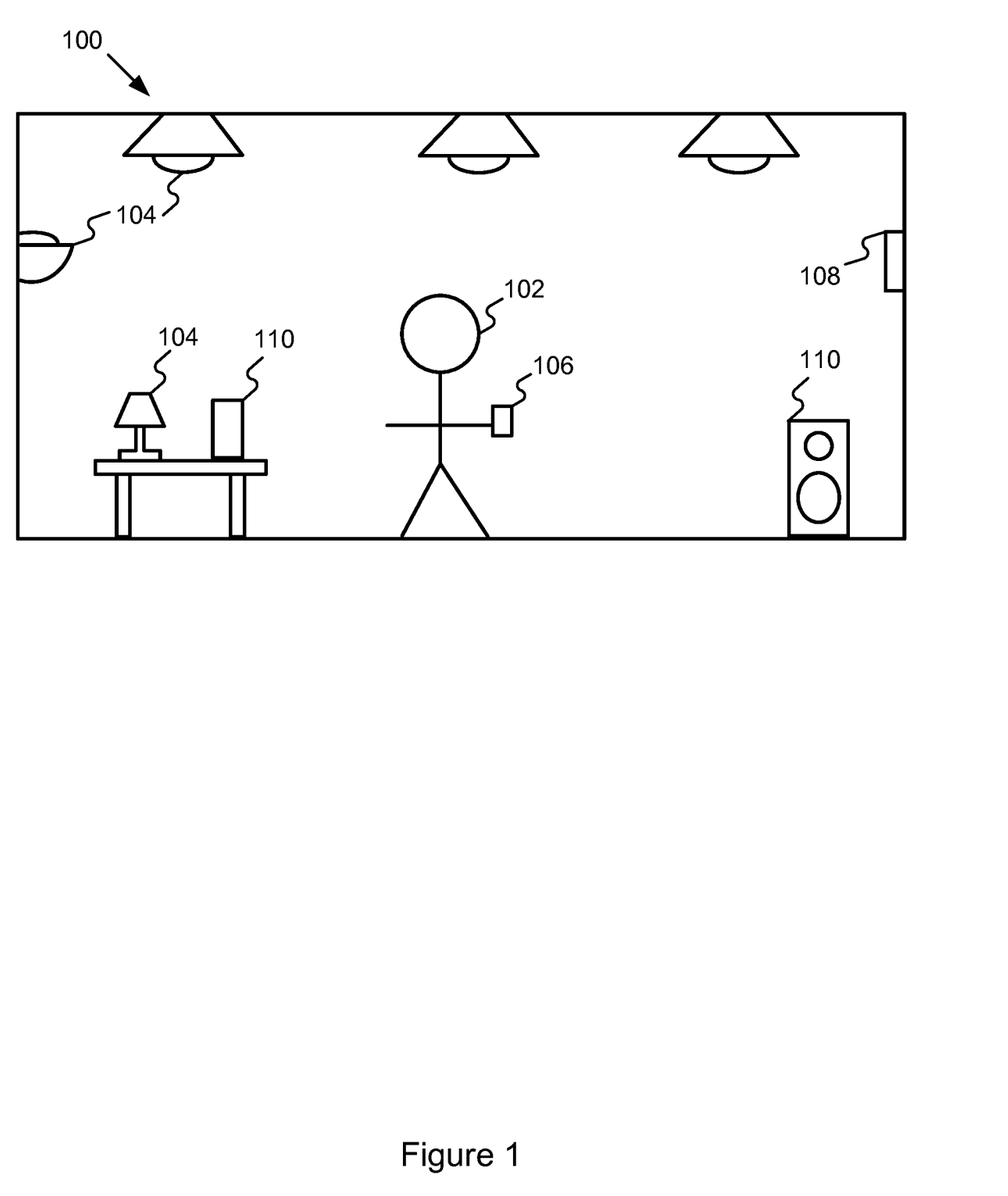
FIG. 1 shows schematically an example environment comprising a system for selecting media content based on a lighting scene.

FIG. 1 illustrates an example environment 100 in which embodiments disclosed herein may be employed. The environment 100 is a space which may be occupied by one or more users 102. The environment 100 may take the form of an indoor space such as one or more rooms of a home, office or other building; an outdoor space such as a garden or park; a partially covered space such as a gazebo; or a combination of such spaces such as a campus or stadium or other public place that has both indoor and outdoor spaces.

The environment 100 is equipped with one or more luminaires 104 installed or otherwise disposed at different locations throughout the environment 100. A luminaire 104 may refer to any kind of illumination device for illuminating an environment or part of the environment occupied by a user 102, whether providing, for example, ambient lighting or specific task lighting. Each of the luminaires 104 may take any of a variety of possible forms, such as a ceiling or wall mounted luminaire, a free-standing floor or table luminaire, or a less traditional form such as a luminaire embedded in a surface or an item of furniture. The different luminaires 104 in the environment 100 need not take the same form as one another. Whatever form it takes, each luminaire 104 comprises at least one lamp (illumination element) and any associated housing, socket and/or support. Examples of suitable lamps include LED-based lamps, or traditional filament bulbs or gas discharge lamps.

In some scenarios the luminaires 104 in the environment 100 may be placed into a plurality of different network groups. Each network group may correspond to a different zone or locality within the environment, such as different rooms, each illuminated by a different respective subset of one or more of the luminaires 104. For example, a zone may correspond to e.g. a living room, kitchen, hall, and bathroom, multiple bedrooms in a home; or multiple offices, hallways, a reception and a canteen or breakroom in an office building. In other examples, a network group may not correspond to any particular zone within the environment. For example, a single zone (e.g. room) may have more than one network group. In another example, a network group may include luminaires from more than one zone.

The environment 100 may also be equipped with one or more lighting control devices 106. Each of the lighting control devices 106 may take the form of a stand-alone lighting control device 106 such as a smart light switch, a dimming switch, etc. or alternatively a lighting control device 106 integrated in another user device such as, for example, a mobile device including mobile or cell phones (including so-called "smart phones"), personal digital assistants, pagers, tablet and laptop computers and wearable communication devices (including so-called "smart watches"). For example, the user terminal may be installed with a suitable lighting control app. The lighting control device 106 can be mains powered, battery powered, or use energy-harvesting techniques to supply its energy. The lighting control device 106 is configured to be able to control the light emitted by one or more luminaires 104 in the environment 100. This may include switching the luminaires 104 on/off, controlling the color of the light, controlling the dimming level, controlling a time-varying effect of the light, controlling a spatially-varying effect of the light or adjusting any other aspects of the light that may be applicable to the luminaires 104 within the environment 100. The environment 100 may also be equipped with a central lighting bridge 108.

The environment is additionally equipped with one or more media devices 110 configured to output audio content. A media device 110 may be a television set, a set top box, a DVD player, an audio amplifier, an audio processor, including for example a surround sound audio processor/amplifier, a personal computing device such as a laptop or desktop or tablet computer, a video game console, a cellular phone (including a so-called "smart phone"), etc. Each media device 110 has, or is connected to, at least one loudspeaker for outputting audio content (or an audio signal) into the environment 100 as sound. For example, at least one speaker may be built-in to the lighting control device 106 or the speaker(s) may be connected to the lighting control device 106 by a wired or wireless connection.

Figure 2:
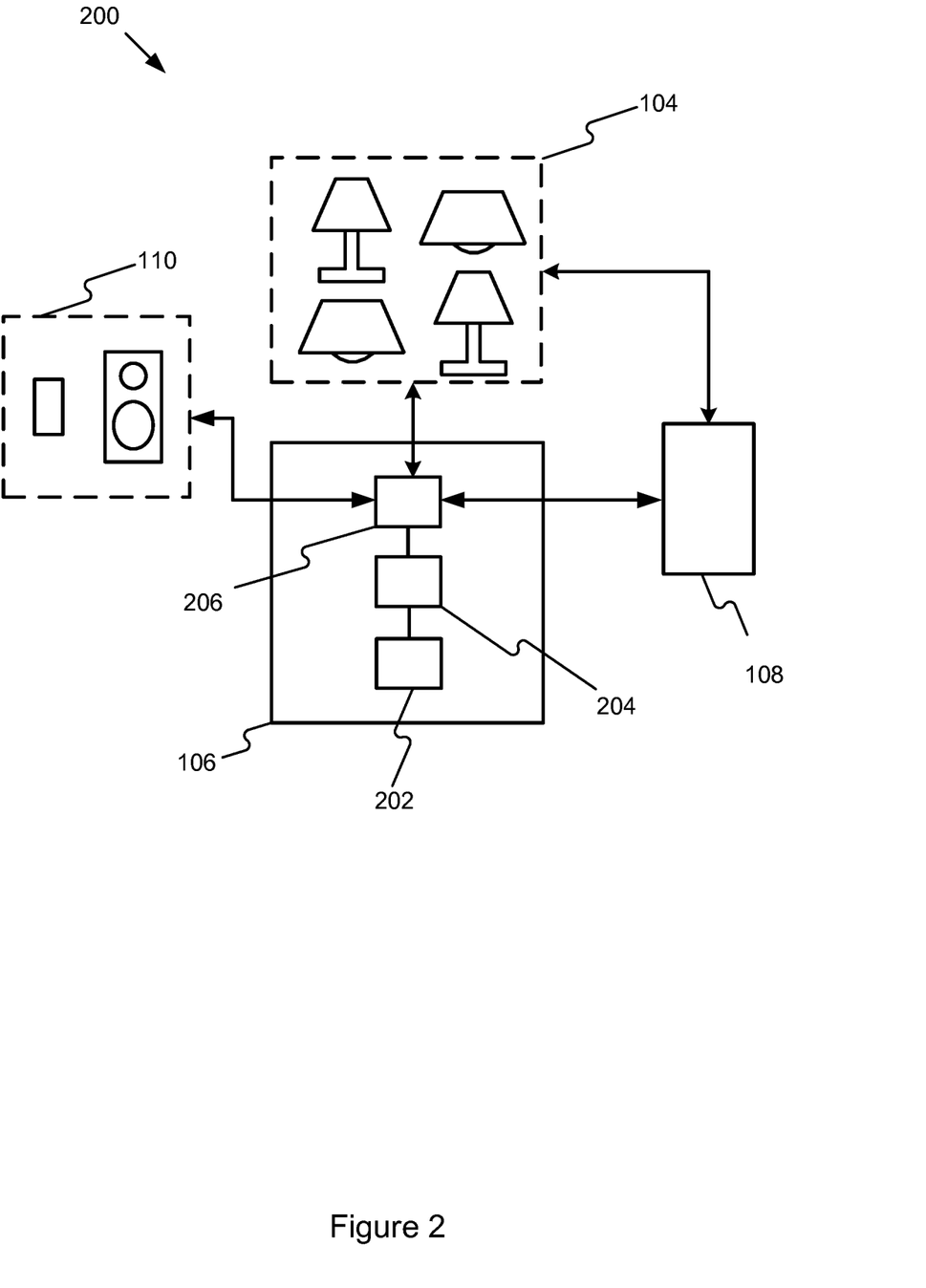
FIG. 2 shows schematically a block diagram of an example control system for controlling the system for selecting media content based on a lighting scene.

FIG. 2 illustrates an example of a system 200 for selecting media content based on a lighting scene. The lighting control device 106 may comprise a user interface 202 arranged to receive an input from the user and operatively coupled to a controller 304. The user interface 202 may comprise a display in the form of a screen and some arrangement for receiving inputs from the user. For example, the user interface 202 may comprise a touch screen, or a point-and-click user interface comprising a mouse, track pad, microphone for detecting voice input, in-air gesture sensor or tracker ball or the like. Alternatively or additionally, the user interface 202 may comprise a dedicated actuator or control panel for controlling the luminaires 104 within the environment 100. For example, the lighting control device 106 may be in the form of a dedicated control unit (wired or wireless) which can be operated by the user 102, e.g. by using one or more buttons, sliders, voice input, gesture input, switches and/or dials of the dedicated control panel.

The controller 204 of the user device 106 may also be coupled to the luminaires 104 and media devices 110 discussed in relation to FIG. 1 via a wireless transceiver 206. The controller 204 may thereby control the luminaire 104 and media devices 110 based on commands input by the user 102. The lighting control device 106, luminaires 104 and media devise 110 may each comprise a respective wireless transmitter and receiver (or transceiver) for communicating via any suitable wireless medium, e.g. a radio transceiver for communicating via a radio channel (though other forms are not excluded, e.g. an ultrasound or infrared transceiver). The wireless transceivers 308 may comprise, for example, a ZigBee, Bluetooth, Wi-Fi, Thread, JupiterMesh, Wi-SUN, 6LoWPAN, etc. interface for communicating with the luminaire 104 and with the central bridge or server 108. For instance, the radio channel may be based on the same radio access technology used by the wireless transceiver (e.g. ZigBee, Bluetooth, Wi-Fi, Thread, JupiterMesh, Wi-SUN, 6LoWPAN, etc.). The radio channel can be used by the lighting control device 106 to control the luminaires 104 and media device 110.

Alternatively, the wireless transceiver 206 may communicate with the luminaires 104 and media devices 110 via the central bridge or a server 108, for example, over a local area network such as a WLAN or a wide area network, such as the internet. Communication may be via the wireless transceivers 206. Alternatively, the luminaires 104 and media devices 110 may each comprise a wired connection, e.g. to communicate with a central bridge 108. In some examples, the wireless transceiver of the luminaire 104 may communicate with other luminaires 104 via a wireless network and/or via the central lighting bridge 108, for example, over a local area network or a wide area network such as the internet. It is also not excluded that a wired connection could alternately, or additionally, be provided between the luminaires 104 themselves, or between the central lighting bridge 108 and the luminaires 104 for control purposes, e.g. an Ethernet or DMX connection. Similarly, a wired and/or wireless connection may exist between the one or more media devices 110 and/or between the media devices 110 and the central bridge 108.

The controller 204 may be configured to perform some or all of the actions of the lighting control device 106 disclosed herein. For example, the controller 204 is configured to receive user commands via the user interface 202. The controller 204 is configured to communicate with one or more luminaires 104 and the one or more media devices 110 within the environment 100 via the wireless transceiver 206 and/or where applicable, the controller is also configured to communicate with the central bridge 108 via the wireless transceiver 206.

In embodiments the controller 204 is implemented in the form of software stored in memory and arranged for execution on a processor (the memory on which the software is stored comprising one or more memory units employing one or more storage media, e.g. EEPROM (electrically erasable programmable read-only memory) or a magnetic drive, and the processor on which the software is run comprising one or more processing units). Alternatively, some or all of the controller 204 could be implemented in dedicated hardware circuitry, or configurable or reconfigurable hardware circuitry such as an ASIC (application-specific integrated circuit) or a PGA (programmable gain amplifier) or FPGA (field-programmable gate array). Whatever form it takes, in embodiments the controller 204 may be implemented internally in a single lighting control device 106 (or any other user device) along with the user interface 202 and the wireless transceiver 206, i.e. in the same housing. Alternatively the controller 204 could, partially or wholly, be implemented externally such as on a central bridge or a server 108 comprising one or more server units at one or more geographic sites. Alternatively, the controller 204 may be partially or wholly implemented across one or more lighting control devices 106. Where required, suitable remote communication and/or distributed processing techniques will, in themselves, be familiar to a person skilled in the art.

In embodiments the functionality of the central bridge/server 108 is implemented in the form of software stored in memory and arranged for execution on a processor (the memory on which the software is stored comprising one or more memory units employing one or more storage media, e.g. EEPROM or a magnetic drive, and the processor on which the software is run comprising one or more processing units). Alternatively it is not excluded that some or all of the functionality of the central bridge/server 108 could be implemented in dedicated hardware circuitry, or configurable or reconfigurable hardware circuitry such as an ASIC or a PGA or FPGA. Also note again that the central bridge or server 108 may be implemented locally within the environment 100 or at a remote location, and may comprise one or more physical units at one or more geographic sites.

The following describes a controller 204 and system 200 for selecting media content based on a lighting scene.

The controller 204 receives a lighting scene (or lighting script or lighting program) selection to be emitted by one or more luminaires 104 in the environment 100. The lighting scene may be a static lighting scene. That is, the lighting emitted by the luminaire(s) 104 remains constant throughout the duration of the lighting scene. For example, the lighting scene may simply be red colored lighting or a palette of multiple colors. The lighting scene may be a dynamic lighting scene. That is, the lighting emitted by the luminaire 104 may vary in space and/or time. For example, the lighting scene may be a "sunrise" scene, in which the lighting changes in color, brightness, etc. to mimic a sunrise.

The lighting scene may be selected in any number of ways. For example, the user 102 may select the lighting scene via a lighting control device 106 such as, a mobile device (e.g. via a smartphone application), a remote control device (e.g. a connected dimmer switch), a traditional light switch (e.g. a wall switch). The lighting scene may be selected by alternative means such as, for example, voice commands, gesture commands, etc. The lighting scene may also be selected automatically. That is, without any direct command from the user 102 to select a scene. In some examples, the lighting scene may be selected through automated behaviors or in response to a trigger. One example would be as part of a routine or time-based trigger. The routine may be an hourly routine, a daily routine, a weekly routine, etc. For example, the lighting scene may be selected depending on the time of day, e.g. every day at 7 am a morning lighting scene may be selected. Another example would be an event trigger. That is, a particular lighting scene is selected in response to a predetermined event. The event may be, for example, the operation of a user device 106 that does not directly control the luminaires 104, such as switching on a television set. A lighting scene may also be selected in response to a location-based trigger. For example, a motion sensor or indoor positioning system may detect a user 102 entering a particular zone in the environment 100, such as a room of a house, e.g. a living room. The lighting scene may be derived by analyzing the luminaires' daily use or the defined (multiple) routines and associated lighting settings.

The lighting scene or lighting script may define the settings of the luminaires 104 in the lighting system over a certain time period. This may be, for example, a twenty-four hour routine which specifies the light scene and changes therein throughout the day. Another example is a dynamic ambiance effect (e.g. candle light, fireplace, meditation light, etc.) that typically spans a few seconds up to a few hours.

The lighting scene has properties which include at least lighting properties (or lighting parameters, lighting settings, lighting characteristics, etc.). For example, the lighting scene may be defined by one or more of the following lighting properties: a lighting scene duration, an intensity (or brightness), a lighting color, a color temperature, a spectral composition, etc.

The lighting scene may also have descriptive properties that describe the lighting scene. These properties may be defined in metadata attached to the lighting scene. For example, the descriptive properties may include a title or name of the lighting scene. The name of the lighting scene may be defined by the user 102 or by a creator of the scene (e.g. the manufacturer of the luminaires 104). The properties may include one or more descriptive tags, e.g. "party", "calm", "study", etc. The properties may include an image and/or a video. For example, the user 102 may select an image (e.g. from their device) and a lighting scene matching that image may be selected, such as a beach lighting scene to match an image of a beach or seaside. Alternatively, a lighting scene may have an image attached to it to allow the user 102 to view a preview of the scene on the user interface 204 of the user device 106. The lighting scene may also have a palette name or identifier that describes the lighting scene using, for example, standardized color codes.

The properties may, additionally or alternatively, include contextual properties based on the environment 100 and/or the luminaires 104 within the environment 100. For example, the contextual properties may define the room type, e.g. the size of the room or the function of the room, in which the lighting scene is emitted. For example, a property may be "living room", "bedroom", "kitchen", etc. The number and/or type of luminaires 104 (or lighting devices) emitting the lighting scene may also be defined. For example, the property may define whether the luminaires 104 are table lamps, ceiling lighting, spotlights, etc.

The controller 204 determines one or more properties of the lighting scene. For example, the controller 204 may analyze the metadata attached to the lighting scene (each property may be defined in metadata). As another example, the lighting properties may be determined by one or more lighting sensors that can determine one or more properties of light, such as a photoresistors, photodiodes, phototransistors, photocell, etc.

The controller 204 selects media content based on the one or more determined properties. The media content may be any form of media which includes audio content (an audio signal, audio component, etc.) The media content may be solely audio content such as, for example, a music file (a song, a radio channel, a podcast, etc.). Alternatively, the media content may have additional content such as, for example, images or video. For example, a television program, film, documentary, video clip, etc. may be selected. The selected media content may comprise one or more items of media content. That is, a single item of media content may be selected (e.g. a single song) or multiple items of media content may be selected (e.g. a plurality of songs or videos, an album of songs, a playlist of songs or videos, multiple songs from the same genre, multiple songs from the same artist). The media content may be selected from memory of one or more of the user's devices. Examples include, amongst others, a mobile phone, a tablet, a stereo system, a portable music player. The media content may be downloaded and/or streamed from a server such as, for example, a media content provider.

The media content may be selected based on one or more lighting properties. For example, the duration of a lighting scene may be used to compose a playlist of media content (e.g. songs) with (approximately) the same duration as the lighting scene. That is, media content may be selected that has a total duration within a predetermined threshold of the total duration of the lighting scene. For example, the lighting scene may last for sixty minutes. Media content may be selected that lasts within a five minute threshold of the lighting scene, e.g. a plurality of songs totaling sixty-two minutes. In general, the threshold may be any amount and may be defined by the user 102, e.g. one minute or more, and media content with a duration less than the lighting scene may be selected, so long as the duration is still within the predetermined threshold.

As another example, if a lighting scene contains highly saturated colors, more intense songs may be selected, while if the scene contains less saturated (e.g. pastel) colors, more ambient or background music may be selected. In the case of the lighting scene having lighting at a higher color temperature, more energetic music may be selected, while for lower color temperatures more relaxing music may be selected. Furthermore, the dynamics level of the lighting scene may be used to select music with corresponding dynamics (the dynamics of music relates to the variation of loudness). For instance, in the case of a static light scene, music with low dynamics (i.e. stable loudness) may be selected, whereas for highly dynamic light scenes, music with high dynamics may be selected.

The media content may be selected based on the color of the lighting scene. For example, color names may be derived from the lighting settings (e.g. red, blue, purple) and used to select music with a title, album, artist, lyrics, etc. corresponding to those lyrics (e.g. lady in red, kind of blue, purple rain). In some examples, media content having a title, album, artist, lyric, etc. associated with other determined lighting properties may be selected. For example, media content having lyrics associated with the name, mood, genre, etc. of the lighting scene may be selected. For example, the properties of the lighting scene may comprise a description of the lighting properties, e.g. bright, dark, gloomy, daylight, warm, cool; and based on this, media content having an artist, lyrics, etc. associated with such properties may be selected. For instance, the description of the scene (e.g. daylight, sunset, gloomy, etc.) may imply one or more colors, and the selected media may comprise music with that/those color(s) in the title and/or lyrics.

The media content may be selected based on a descriptive tag or other metadata. For example, a lighting scene name or metadata, tags, label, etc. may describe the mood and/or activity of the lighting scene. If for example, the scene name is called "party", music may be selected that is suitable for a party (e.g. dance, pop, and disco). If the lighting scene has a tag that refers to the scene being "cozy", intimate music may be selected.

The media content may be selected based on one or more contextual properties. For example, if an energizing lighting scene is selected for the gym room, a workout playlist may selected. In addition, the luminaires 104 rendering the light scene may help to determine the media content that is selected. For instance, in some lighting scenes only compact ceiling spotlights may be active, and therefore music instruments or singers having a high pitch (e.g. female singers, violins) may be selected. In the case that large floor lamps or long light strips in lower parts of the room are active, this may result in the selection of music with instruments or singers having a lower pitch (e.g. male singers, kettledrums).

The controller 204 causes the selected media content to be output by one or more media devices 110. At least one of the media devices 110 has loudspeakers for outputting the audio content of the media content. For example, the media content may be played out by a television set, a Hi-Fi system, a stereo system, a sound bar, etc. The selected media content may be rendered by media devices 110 co-located with or associated with the luminaire(s) 104 with which the lighting scene is being emitted. For example, the media devices 110 may be located within the same room or rooms as the luminaires 104. However it is not necessary for the media devices 110 to be located within the same room or zone as the luminaire 104. For example, a lighting scene may be selected for the kitchen and the media devices 110 within the kitchen and/or the living room may output the media content.

The determined properties of the lighting scene may determine the volume, loudness, equalization, etc. at which the media content is output. As an example case, if the lighting scene is determined to be a "study" scene, the media content may be output at a low volume. As another example, the intensity of the active lighting scene may affect the media content, such that a dimmed lighting scene causes music to be played back softly while a bright lighting scene would result in music being played at a louder volume level.

In some embodiments, the lighting scene is assigned a score based on the determined properties of that lighting scene. The lighting scene may be scored based on each determined property or a selection of the determined properties. The determined lighting scene score may be used by the controller 204 when selecting media content, as will be described below.

The lighting scene may be scored on a global level. That is, the lighting scene may be given a score based on the properties of the lighting scene as a whole, i.e. properties that do not change throughout out the duration of the lighting scene. Examples of these "global" properties include the name of the lighting scene, the duration of the lighting scene, the number and/or types of the luminaires 104 that are involved in rendering the lighting scene, the room (or zone) within the environment 100 in which the lighting scene is produced, the mood or theme of the lighting scene, the color palette, the dynamic mode (e.g. subtle, intense, etc.), and the dynamic speed (which may be, for example, slow or fast, or a score between, say 1 and 10). An example of the properties that may contribute to the global score is as follows, where "LightScene 1" is the name of the lighting scene:

```
LightScene1 {
    name: Relax,
    lights: [1,2,4],
    duration: 00:58:45:01,
    room: Living,
    mood: cozy,
    color_palette: [33848,21435,44309]
    dynamic_mode: subtle,
    dynamic_speed: 27
}
```

Additionally or alternatively, the lighting scene may be given one or more local scores on a per time unit basis. That is, the lighting scene may be divided into a plurality of time units (e.g. seconds, minutes, hours), each time unit having its own score. For example, each thirty seconds of lighting scene may be assigned a score. As another example, each timestamp may be assigned a score. The local score(s) may be based on the properties that are specific to the respective time unit or timestamp. Here, specific does not imply that each time unit will have a unique value of a property, it is merely intended to signify that the property characterizes the lighting scene at a specific point in time. Examples of these "local" properties include the brightness, hue, saturation, transition number, color temperature, spectral composition, etc. An example of the properties that may contribute to the local score at timestamp 1511953290 is as follows:

```
LightScene1 {
    timestamp: 1511953290
    hue: 33848,
    saturation: 44,
    brightness: 85,
    transition: 200,
}
```

The lighting scene may be scored over a plurality of sequential time intervals. The time intervals may be contiguous (e.g. a respective score for two or more adjacent time units), or they may be separated in time (e.g. a first score for the first one minute of lighting scene and a second score for the time period between the tenth and eleventh minutes of the lighting scene). The time intervals may be of the same or different durations. Furthermore, the determined score of the lighting scene may be a single score that is based on one or more of the scores of the plurality of time intervals. That is, the lighting scene may be assigned an overall score based on a function of the plurality of time interval scores. The function may be, for example, the mean, median or mode. Alternatively, the determined score of the lighting scene may be an array made up of one or more of the scores of the plurality of time intervals.

In some embodiments, the characterization of the lighting scene contains less lighting specific properties and instead be characterized more generally such that the lighting scene can be matched not only to media content (e.g. video or music), but also to other modalities such as heating. For example, the selected lighting scene may cause a specific heating schedule to be selected. As another example, the selected lighting scene may cause the controller 204 to operate one or more curtains or blinds to open or close to a predetermined level. Examples of generic characteristics are mood, intensity, harmonic/disharmonic, spatial dynamics, temporal dynamics, color dynamics, etc.

Like the lighting scene, the media content (or content items) that are available for selection may also be assigned a score based on one or more properties of each item of media content. The media content may be scored on properties such as, for example, loudness, dynamics, spectral composition, key, mode (e.g. major or minor), timbre, chords, instruments, vocal or instrumental, duration, tempo, beats, sections, title, lyrics, artist name, album name, genre, mood, etc. Like the lighting scene, the media content may be scored on a global level (i.e. based on properties of the media content as a whole, such as a song title) and/or a local level (i.e. based on properties characterizing the media content during a specific time interval, such as the tempo). The media content may be scored over a plurality of sequential time intervals. The time intervals may be contiguous (e.g. a respective score for two or more adjacent time units), or they may be separated in time (e.g. a first score for the first one minute of media content and a second score for the time period between the tenth and eleventh minutes of the media content). The time intervals may be of the same or different durations. Furthermore, the determined score of the media content may be a single score that is based on one or more of the scores of the plurality of time intervals. That is, the media content may be assigned an overall score based on a function of the plurality of time interval scores. The function may be, for example, the mean, median or mode. Alternatively, the determined score of the media content may be an array made up of one or more of the scores of the plurality of time intervals.

The determined score of the lighting scene and the determined score of the media content (items) may be used to select one or more items of media content. Each media content (e.g. song or playlist) may be scored against their fit with the lighting scene properties. For example, the media content with the most similar score to the lighting scene may be selected. The lighting scene score may be used as a benchmark for the media content, with media content items scoring above the benchmark being selected. In some examples, the highest scoring media content is selected. In some examples, the media content item with the plurality of time interval scores that most closely match the plurality of time interval scores of the lighting scene may be selected. Here, most closely matched may mean that the two array of scores (the lighting scene array and the media content array) have the most scores in common, or the most scores within a threshold of one another. For example, media content with a closely matching score at time intervals 1-3 mins, 3-5 mins, and 5-7 mins may be selected. More than one item of media content may be selected and played, or provided as suggestions for the user 102 to select from (e.g. on a display screen or through voice control). The selection may include a randomness factor to avoid repetitive selection or deep learning algorithms for improved music selection.

The media content may be selected based on an association between the media content that is available to select and the determined one or more properties of the selected lighting scene. For example, the controller 204 may have access to a model (e.g. a database) that describes the associations between lighting properties and properties of media content (e.g. audio properties). This model may be created by a lighting expert, a lighting designer, or a musical expert. The user 102 of the system may also define the associations, e.g. via a user interface 204. For example, the user 102 may associate their favorite songs with a particular lighting scene, or with a particular property of a lighting scene, such as associating songs by a particular artist with a "party" lighting scene. In some examples, the associations between the lighting properties and the audio parameters are automatically created or adapted based on previous use of the system. For example, the controller 204 may use a machine learning algorithm to learn from usage behavior and feedback on lighting scene and media content selection.

After the controller 204 selects media content based on the determined properties of the selected lighting scene and causes the media content to be output (e.g. played), the controller 204 then, at some point in time, adjusts one or more of the lighting properties based on the audio content of the selected media content. The lighting properties may be adjusted continuously, periodically, or intermittently. The lighting properties may be adjusted once or multiple times.

For example, the lighting scene may be adjusted to account for temporal effects in the selected media content (e.g. song). For example, information about the timing of beats or tempo of a piece of music may be used to adjust the dynamic properties of the lighting scene. In this way, the lighting scene may be synchronized with the music, e.g. by synchronizing the lighting transitions with the transitions in the music.

In another example, the duration of lighting scene may be adjusted based on the selected media content. That is, the lighting scene may have an initial pre-set duration (e.g. thirty minutes). A playlist of relaxing music tracks may be selected based on properties of the lighting scene (e.g. a sunset lighting scene). The music tracks may be ordered based on the selected lighting scene, such that the slowest and softest music is played towards the end of the lighting scene. However, the playlist duration is not the same as the playlist (e.g. 32.15 minutes). The controller 204 may adjust the duration of the lighting scene such that it matches the duration of the media content by shortening or lengthening the lighting scene. In this example, the lighting scene is lengthened by 2.15 minutes. Subsequently, the media content may be extended based on the properties of the originally selected lighting scene, the adjusted lighting scene, and the media content (e.g. the songs in the playlist). This way new media content (e.g. songs) may be added without substantially deviating from the original lighting scene selection.

As an example use case, a user 102 can create a 24-hour lighting scene which describes the light setting (lighting properties) for certain times of day. For each time slot, a matching playlist is automatically selected based on the name of the light scene, the room type it is in, etc. During playback of the music, the lighting scene is adjusted based on the music that is played. For example, the intensity of the light may subtly pulse with the rhythm of the music using the beat information from the song.

In another example, the user 102 activates a dynamic lighting scene via a user interface 204. Properties of the lighting scene are used to select a playlist of songs from a music streaming service. If the user 102 selects a "relax" scene in the living room, a "chill out" playlist may be selected, while if the user 102 activates an "energize" scene in the gym room, a "workout" playlist may be selected. The "relax" scene may be adjusted to account for the songs in the "chill out" playlist. For example, the color temperature of the lighting may be reduced to account for calmer songs, which may be determined from the song titles or lyrics, for example. Likewise, the brightness of the "energize" scene may be adjusted to account for the instruments of the "workout" playlist, e.g. the brightness increases when drums are played.

Figure 3:
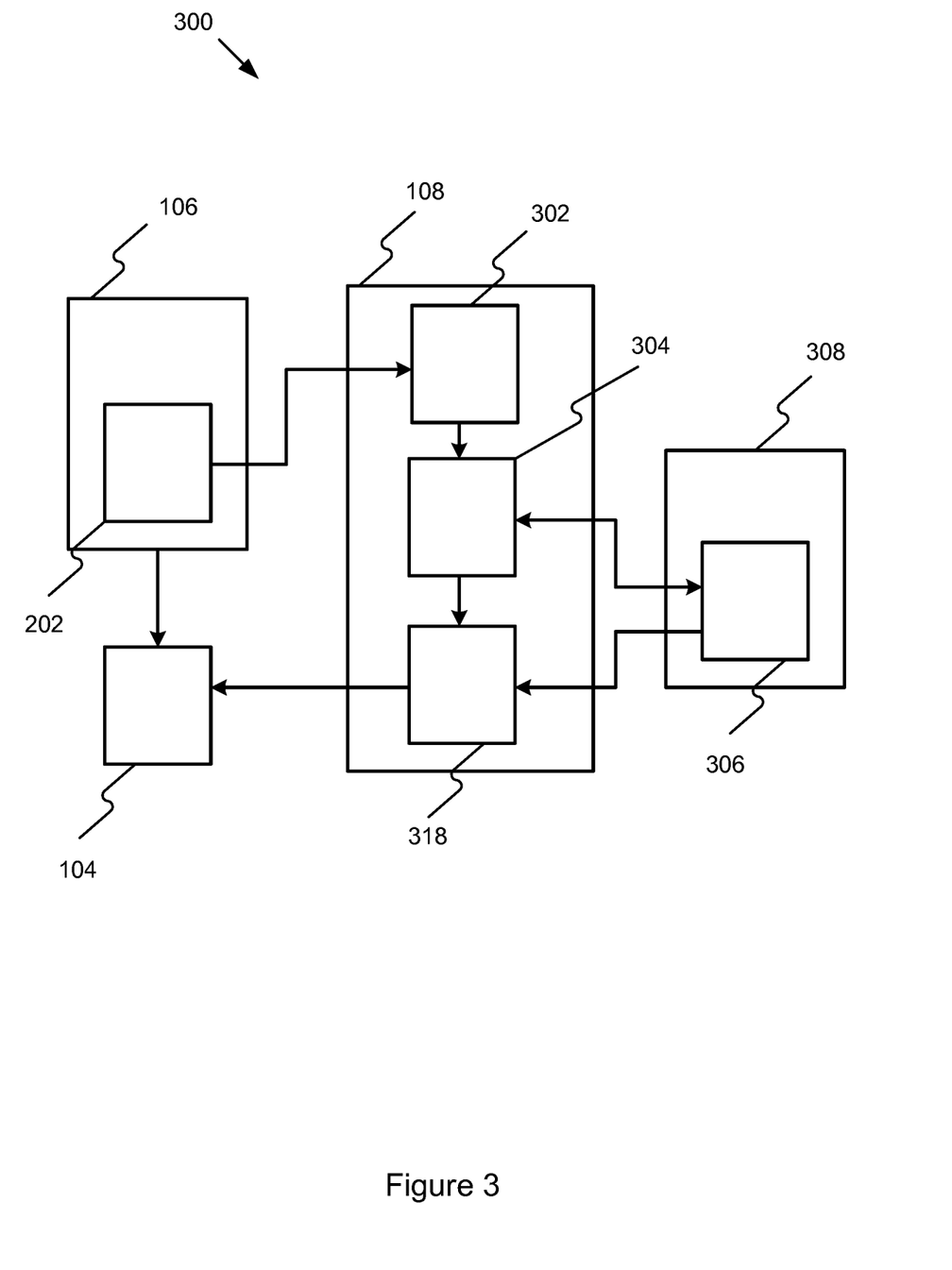
FIG. 3 shows schematically an example high level overview of the system for selecting media content based on a lighting scene.

FIG. 3 shows an example of a system 300 for selecting media content based on a lighting scene. A lighting control device 106 is configured to receive a lighting scene selection via a lighting control interface 202. A selection of luminaires 104 are controlled to emit lighting in accordance with the selected lighting scene. A lighting scene analyzer 302, which may be implemented at a central bridge 108, analyses the properties of the selected lighting scene and determines one or more properties. A music-to-lighting mapper 304 determines media content to be selected based on the selected lighting scene and communicates with a music playback service 306. The music playback service 306 may be located on a user device 106 or on a (cloud) server 308. The music playback service 306 communicates lighting-relevant music properties to a lighting controller 310, which in turn controls the luminaires 104 to change one or more properties of the emitted lighting.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented method for selecting media content based on a lighting scene, the method comprising:
   selecting the lighting scene, the lighting scene having one or more properties comprising of at least one of: a name of the lighting scene, one or more descriptive tags, an image, a video, and a palette name;
   determining one or more of the properties of the lighting scene;
   selecting media content based on the determined one or more of the properties, wherein the media content comprises audio content;
   controlling a media device to output the media content; and
   adjusting one or more of: a duration, an intensity, a color, a color temperature, and a spectral composition of the lighting scene based on the audio content of the media content.

2. A method according to any of claim 1, wherein the determined one or more properties of the lighting scene comprise at least one contextual property, wherein the contextual properties comprise one or more of: a room type, a lighting device type, and/or a number of lighting devices.

3. A method according to claim 1, wherein said selecting of media content comprises selecting one or more of: a song, an album, an artist, a playlist, a genre, a radio channel, and a video.

4. A method according to claim 1, wherein said selecting of the media content comprises:
   determining a score of the lighting scene based on the determined one or more properties;
   determining a score of one or more items of media content; and
   selecting at least one of said items of media content based on the determined score of the lighting scene and the determined score of the items of media content.

5. A method according to claim 4, wherein the lighting scene is scored over a first plurality of sequential time intervals, wherein the determined score of the lighting scene is a function of a first plurality of scores determined for the first plurality of sequential time intervals respectively, wherein each item of media content is scored over a second plurality of sequential time intervals, and wherein the determined score of each item of media content is a function of a second plurality of scores determined for the second plurality of sequential time intervals respectively.

6. A method according to claim 1, wherein the lighting scene is selected automatically in response to a pre-determined trigger, wherein the pre-determined trigger is at least one of: a time-based trigger, an event-based trigger, and a location-based trigger.

7. A method according to claim 1, wherein the one or more of the determined properties of the lighting scene comprise at least one color or a description associated with at least one color; and said selecting of the media content comprises selecting media content having a title and/or lyric that comprises a color matching the at least one color or description.

8. A method according to claim 1, wherein the media content is selected based on an association between the media content and the determined one or more properties of the lighting scene, and
  wherein said association is predetermined by a user, or
  wherein said association is automatically created and/or adapted based on one or more associations previously predetermined by the user.

9. A method according to claim 1, wherein said controlling comprises controlling the media device to output the media content at a volume level, and/or with equalization settings, based on the determined one or more properties of the lighting scene.

10. A method according to claim 1, wherein the one or more of the lighting properties are adjusted based on a temporal property of the media content.

11. A computer program product for selecting media content based on a lighting scene, the computer program product comprising code embodied on one or more computer-readable storage media and configured so as when executed on one or more processors to perform operations of:
  receiving a selection of the lighting scene, the lighting scene having one or more properties comprising of at least one of: a name of the lighting scene, one or more descriptive tags, an image, a video, and a palette name;
  determining one or more of the properties of the selected lighting scene;
  selecting media content based on the determined one or more of the properties, wherein the media content comprises audio content;
  causing the media content to be output by a media device; and
  adjusting one or more of: a duration, an intensity, a color, a color temperature, and a spectral composition of the lighting scene based on the audio content of the media content.

12. A controller for selecting media content, to be rendered by a media device, based on a lighting scene, wherein the controller is configured to:
  receive a selection of the lighting scene, the lighting scene having one or more properties comprising of at least one of: a name of the lighting scene, one or more descriptive tags, an image, a video, and a palette name;
  determine one or more of the properties of the lighting scene;
  select media content based on the determined one or more of the properties, wherein the media content comprises audio content;
  control the media device to output the content; and
  adjust one or more of: a duration, an intensity, a color, a color temperature, and a spectral composition of the lighting scene based on the audio content of the media content.

* * * * *